(12) United States Patent
Chevers et al.

(10) Patent No.: US 10,974,570 B2
(45) Date of Patent: Apr. 13, 2021

(54) LIMIT FOR COMPRESSOR SPEED BASED ON INVERTER TEMPERATURE FOR AIR CONDITIONER IN VEHICLE

(71) Applicant: Toyota Motor Engineering & Manufacturing North America, Inc., Plano, TX (US)

(72) Inventors: Netsanet S. Chevers, Ann Arbor, MI (US); Hidekazu Hirabayashi, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 281 days.

(21) Appl. No.: 15/957,820

(22) Filed: Apr. 19, 2018

(65) Prior Publication Data

US 2019/0322158 A1 Oct. 24, 2019

(51) Int. Cl.
*B60H 1/00* (2006.01)
*B60H 1/32* (2006.01)

(52) U.S. Cl.
CPC ... *B60H 1/3205* (2013.01); *B60H 2001/3245* (2013.01); *B60H 2001/3255* (2013.01); *B60H 2001/3272* (2013.01); *B60H 2001/3292* (2013.01)

(58) Field of Classification Search
None
See application file for complete search history.

(56) References Cited

U.S. PATENT DOCUMENTS

| | | | |
|---|---|---|---|
| 5,547,125 A | 8/1996 | Hennessee et al. |
| 5,653,904 A | 8/1997 | Adlparvar et al. |
| 5,699,857 A | 12/1997 | Flaishans et al. |
| 5,988,517 A | 11/1999 | Bauer et al. |
| 5,995,889 A | 11/1999 | Eisenhour |
| 6,304,803 B1 | 10/2001 | Dao |
| 6,454,178 B1 | 9/2002 | Fusco et al. |
| 6,868,900 B2 | 3/2005 | Dage et al. |

(Continued)

FOREIGN PATENT DOCUMENTS

| | | |
|---|---|---|
| JP | 2006151098 | 6/2006 |
| JP | 2013035302 | 2/2013 |

OTHER PUBLICATIONS https://www.howacarworks.com/basics/how-car-heating-and-ventilation-systems-work; 7 pages; 2018.
http://www.airconcars.com/html/how_it_works.html; 3 pages; 2018.

*Primary Examiner* — James M McPherson
(74) *Attorney, Agent, or Firm* — Snell & Wilmer LLP

(57) ABSTRACT

Methods, systems, and apparatus for a heating, ventilation and air conditioning (HVAC) system that limits the speed of the compressor to allow for the adoption or use of an internal heat exchanger. The HVAC system includes a compressor configured to drive refrigerant flow and an inverter configured to control a speed of the compressor. The HVAC system includes a first sensor configured to measure a temperature of the inverter and an electronic control unit. The electronic control unit is configured to obtain, from the first sensor, the temperature of the inverter. The electronic control unit is configured to determine a range of speeds for the compressor based on the obtained temperature of the inverter. The electronic control unit is configured to operate the compressor within the determined range of speeds.

18 Claims, 5 Drawing Sheets

(56) References Cited

U.S. PATENT DOCUMENTS

| | | |
|---|---|---|
| 6,892,550 B2 | 5/2005 | Takemoto et al. |
| 6,971,246 B2 | 12/2005 | Kurata et al. |
| 6,978,628 B2 | 12/2005 | Honda |
| 7,010,400 B2 | 3/2006 | Hisada et al. |
| 7,156,167 B2 | 1/2007 | Errington et al. |
| 7,398,653 B2 | 7/2008 | Oomura et al. |
| 8,151,581 B2 | 4/2012 | Chen et al. |
| 8,307,927 B2 | 11/2012 | Taguchi et al. |
| 8,346,422 B2 | 1/2013 | Chen |
| 8,626,381 B2 | 1/2014 | Tate, Jr. et al. |
| 8,745,997 B2 | 6/2014 | Kumar et al. |
| 8,839,632 B2 | 9/2014 | Goenka et al. |
| 8,849,487 B2 | 9/2014 | Malone et al. |
| 8,933,658 B2 | 1/2015 | Ganev et al. |
| 9,168,810 B2 | 10/2015 | Ghosh et al. |
| 9,272,602 B2 | 3/2016 | Rollinger et al. |
| 9,662,959 B2 | 5/2017 | Pebley et al. |
| 9,694,652 B2 | 7/2017 | An et al. |
| 9,758,011 B2 | 9/2017 | Johnston |
| 9,821,625 B2 | 11/2017 | Graaf et al. |
| 9,827,824 B2 | 11/2017 | Enomoto et al. |
| 9,840,126 B2 | 12/2017 | Kanemaru et al. |
| 2008/0034767 A1 | 2/2008 | Ziehr et al. |
| 2009/0043429 A1 | 2/2009 | Minekawa |
| 2009/0241570 A1* | 10/2009 | Kuribayashi ......... F25B 49/005 62/225 |
| 2010/0236770 A1 | 9/2010 | Pursifull |
| 2010/0304654 A1 | 12/2010 | Kakizaki et al. |
| 2013/0160986 A1 | 6/2013 | Hashigaya et al. |
| 2013/0196586 A1 | 8/2013 | Hoke et al. |
| 2014/0223943 A1 | 8/2014 | Ichishi et al. |
| 2015/0151609 A1 | 6/2015 | Satou et al. |
| 2015/0224851 A1 | 8/2015 | Baker |
| 2016/0018153 A1 | 1/2016 | Ragazzi |
| 2017/0166031 A1 | 6/2017 | Shin et al. |
| 2017/0267065 A1 | 9/2017 | Kim et al. |
| 2017/0368909 A1 | 12/2017 | Choi et al. |
| 2017/0370626 A1* | 12/2017 | Ohyama ............... B60H 1/3225 |
| 2019/0070924 A1* | 3/2019 | Mancini ................. B60L 58/26 |
| 2019/0092134 A1* | 3/2019 | Vehr ........................ F25B 5/02 |
| 2019/0331357 A1* | 10/2019 | Rogerson ............... F25D 17/005 |

\* cited by examiner

| STATE | | COMPRESSOR SPEED (rpm) | | | | | |
|---|---|---|---|---|---|---|---|
| NORMAL | | 4000 | 5000 | 6000 | 7000 | 8000 | 9000 |
| NO SCX | >= THRESHOLD TEMPERATURE | 3000 | 4000 | 5000 | 6000 | 7000 | 8000 |
| NO SCX | < THRESHOLD TEMPERATURE | 4000 | 5000 | 6000 | 7000 | 8000 | 9000 |
| WITH SCX | >= THRESHOLD TEMPERATURE | 2000 | 3000 | 4000 | 5000 | 6000 | 7000 |
| WITH SCX | < THRESHOLD TEMPERATURE | 4000 | 5000 | 6000 | 7000 | 8000 | 9000 |

FIG. 5

LIMIT FOR COMPRESSOR SPEED BASED ON INVERTER TEMPERATURE FOR AIR CONDITIONER IN VEHICLE

BACKGROUND

Field

This specification relates to limiting the rotation speed of the motor of the compressor of an air conditioner within a vehicle.

Description of the Related Art

In order to increase the output and efficiency of a motor vehicle air conditioning system, the air conditioning system may have an internal heat exchanger, such as a coaxial tube internal heat exchanger (SCX). The internal heat exchanger may couple a section of the refrigerant circuit running between the evaporator and the compressor. The internal heat exchanger may be positioned before the compressor. Refrigerant may pass through the heat exchanger and draw heat from the surrounding air, which cools the surrounding air. The internal heat exchanger, however, may cause an increase in the inlet gas temperature of the air into the compressor.

An electric compressor has an inverter, which operates more efficiently at cooler temperatures, while suffering power loss and/or damage at higher internal temperatures. The inlet gas is used to decrease the temperature of the inverter. If or when the inlet gas temperature increases, the temperature of the inverter may also increase, which may result in damage, power loss or other inefficiencies.

Accordingly, there is a need to minimize, reduce or otherwise limit the temperature of the inverter, to allow for a coaxial tube internal heat exchanger to be used to increase the efficiency of the air conditioning system.

SUMMARY

In general, one aspect of the subject matter described in this specification may be embodied in a heating, ventilation and air conditioning (HVAC) system. The HVAC system includes a compressor configured to drive refrigerant flow and an inverter configured to control a speed of the compressor. The HVAC system includes a first sensor configured to measure a temperature of the inverter and an electronic control unit. The electronic control unit is connected to at least one of the compressor, the inverter or the first sensor. The electronic control unit is configured to obtain, from the first sensor, the temperature of the inverter. The electronic control unit is configured to determine a range of speeds for the compressor based on the obtained temperature of the inverter. The electronic control unit is configured to operate the compressor within the determined range of speeds.

These and other embodiments may optionally include one or more of the following features. The electronic control unit may be further configured to determine whether the temperature of the inverter is greater than or equal to a threshold temperature. The electronic control unit may set a first maximum speed for the range of speeds for the compressor if or when the temperature of the inverter is greater than or equal to the threshold temperature to prevent damage to the inverter due to overheating. The electronic control unit may be further configured to set a second maximum speed for the range of speeds for the compressor if or when the temperature of the inverter is less than the threshold temperature.

The first maximum speed may be less than the second maximum speed. The range of speeds may have a first maximum speed if or when the temperature of the inverter is greater than or equal to a threshold temperature and a second maximum speed if or when the temperature of the inverter is less than the threshold temperature.

The electronic control unit may be configured to obtain a user-configured temperature. The electronic control unit may calculate a target airflow temperature based on the user-configured temperature. The electronic control unit may determine a speed of the compressor that is within the range of speeds and is based on the target airflow temperature. The electronic control unit may be configured to operate the compressor at the determined speed.

The HVAC system may include a second sensor. The second sensor may be configured to detect or measure at least one of an amount of humidity in a surrounding environment or an ambient temperature of the surrounding environment. The electronic control unit may be configured to calculate the target airflow temperature based on the at least one of the amount of humidity in the surrounding environment or the ambient temperature of the surrounding environment.

In another aspect, the subject matter may be embodied in a method for limiting a speed of a compressor. The method includes measuring, by a first sensor, a temperature of an inverter of the compressor. The method includes obtaining, by a processor and from the first sensor, the temperature of the inverter of the compressor. The method includes determining, by the processor, whether the temperature of the inverter is greater than or equal to a threshold value. The method includes controlling, by the processor, the speed of the compressor based on the determination of whether the temperature of the inverter is greater than or equal to the threshold value.

In another aspect, the subject matter may be embodied in a HVAC system for a vehicle. The HVAC system includes a compressor configured to drive refrigerant flow. The HVAC system includes an inverter configured to control a speed of the compressor. The HVAC system includes a first sensor configured to measure a temperature of the inverter. The HVAC system includes an electronic control unit connected to at least one of the compressor, the inverter or the sensor. The electronic control unit is configured to obtain, from the first sensor, the temperature of the inverter. The electronic control unit is configured to determine a maximum limit for the speed of the compressor based on the obtained temperature of the inverter. The electronic control unit is configured to operate the compressor below the maximum limit for the speed of the compressor.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 5 is an example mapping of inverter temperature to compressor rotation speed with and without a SCX according to an aspect of the invention.

DETAILED DESCRIPTION

Disclosed herein are systems, vehicles and methods for limiting the compressor rotation speed to allow for use or installation of a coaxial tube internal heat exchanger (SCX). Particular embodiments of the subject matter described in this specification may be implemented to realize one or more of the following advantages. The heating, ventilation and air conditioning (HVAC) system controls the rotation speed of the compressor so that the temperature of the inverter does not exceed a maximum threshold temperature. By preventing the inverter from exceeding a maximum threshold temperature, the HVAC system reduces damage to the inverter and allows the compressor to operate more efficiently by reducing power loss. A more efficient compressor more efficiently pumps refrigerant vapor under high pressure to the condenser, which condenses the vapor to a liquid and in the process allows the heat to be removed to provide the refrigerant to the evaporator. The pressurized refrigerant from the compressor may move to a receiver and then through an expansion valve before being provided to the evaporator. The expansion valve removes the pressure from the liquid refrigerant so that the refrigerant can expand and become refrigerant vapor in the evaporator.

Other benefits and advantages include allowing for the use of a coaxial tube internal heat exchanger (SCX). The HVAC system controls and/or operates the compressor within a determined range of rotation speeds, which maintains and/or limits the maximum rotation speed of the compressor. By maintaining or limiting the maximum rotation speed of the compressor, the temperature at the inverter is suppressed or limited, which allows for the adoption of a coaxial internal heat exchanger (SCX) or a longer SCX. The adoption of the SCX or the longer SCX further improves cooling efficiency.

Figure 1:
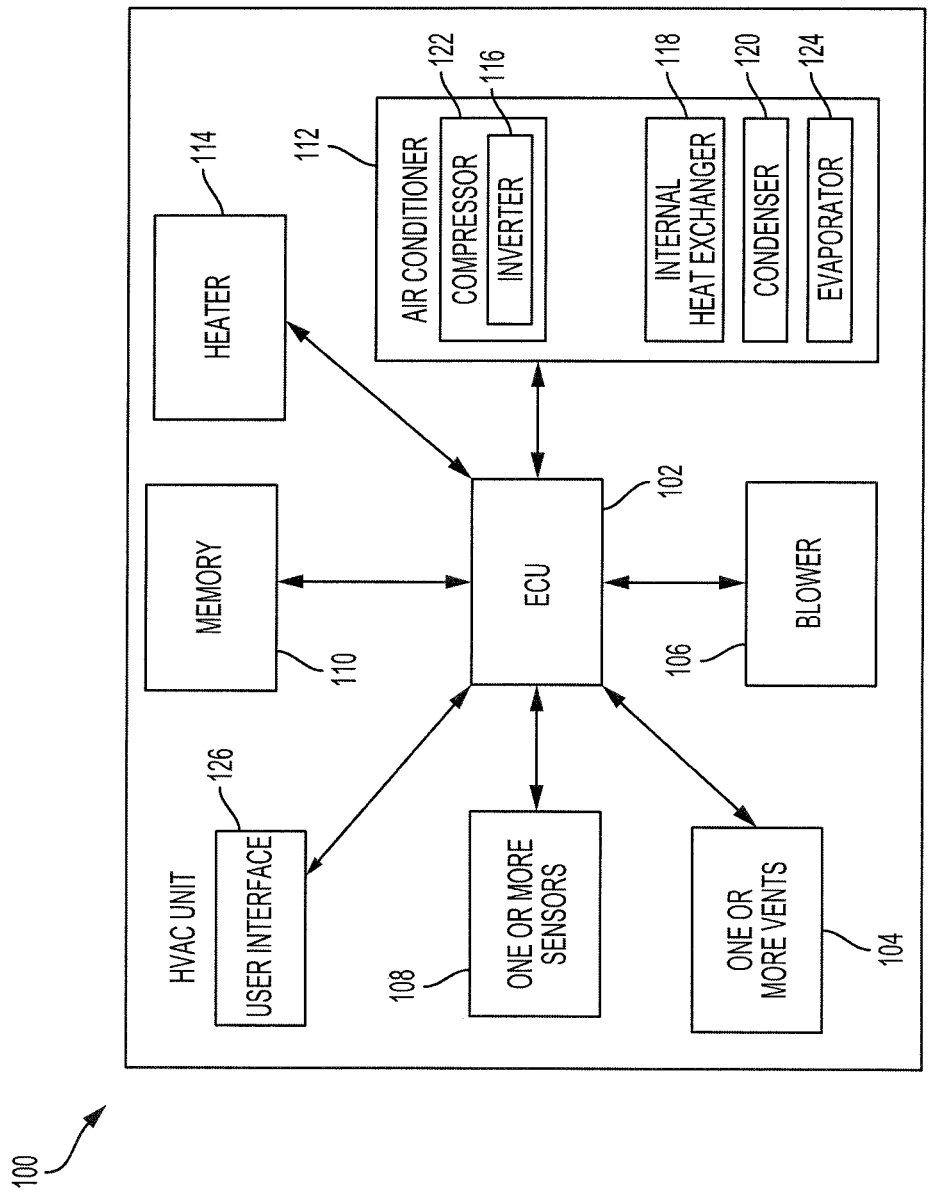
FIG. 1 is a block diagram of an example heating, ventilation and air conditioning (HVAC) system according to an aspect of the invention.
Figure 2:
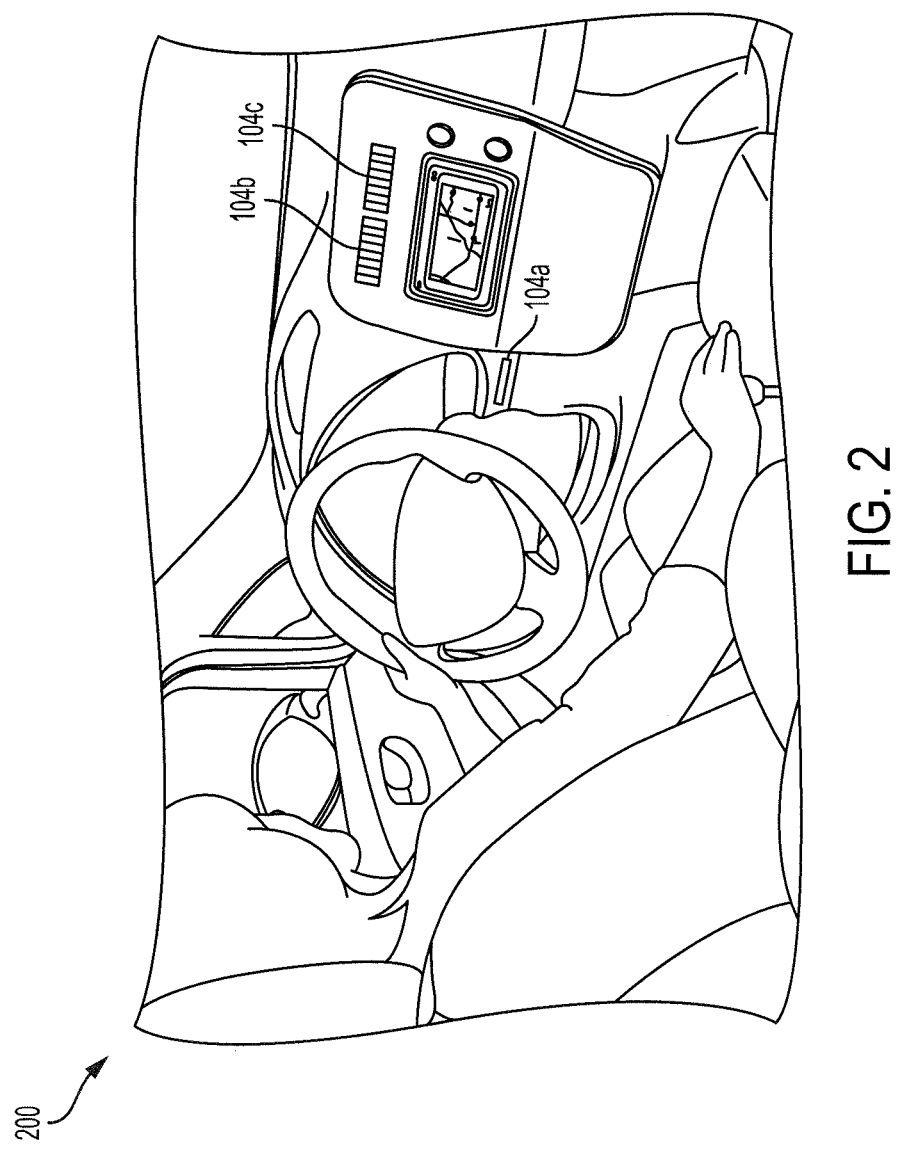
FIG. 2 shows an inside view of the front of the cabin of the vehicle according to an aspect of the invention.

FIG. 1 is a block diagram of a heating, ventilation and air conditioning (HVAC) system 100. The HVAC system 100 controls the heating, ventilation and air conditioning within the vehicle to provide comfort to the driver and passengers. The HVAC system 100 may be installed, included, part-of, or retrofitted within a vehicle to provide comfort to occupants of the vehicle. For example, the HVAC system 100 may provide ventilation or circulation of air in any space, such as a cabin of a vehicle 200 of FIG. 2 for example. Additionally, the HVAC system 100 may heat or cool the air that is circulated and/or replenished within the space. The HVAC system 100 may include multiple HVAC units that independently control the air within the environment of a front of the cabin and/or a rear of the cabin of the vehicle 200. FIG. 2 shows an inside view of the front of the cabin of the vehicle 200. The HVAC system 100 may output air through one or more vents 104 including the vents 104*a-c* to adjust the temperature within the front of the cabin of the vehicle 200.

A vehicle, e.g., vehicle 200, is a conveyance capable of transporting a person or persons or any material or any permanently or temporarily affixed apparatus. The vehicle may be a self-propelled wheeled conveyance, such as a car, a truck, a bus, a van or other motor and/or battery driven vehicle. For example, the vehicle 200 may be an electric vehicle, a hybrid vehicle, a plug-in hybrid vehicle, or a fuel-cell vehicle. Other examples of vehicles include bicycles, trains, planes, or boats, and any other form of conveyance that is capable of transportation. The vehicle may be a semi-autonomous or an autonomous vehicle. That is, the vehicle 200 may be self-maneuvering and capable of sensing the environment and navigating without human input.

The HVAC system 100 includes a processor, such as an electronic control unit 102, one or more vents 104, a blower 106, one or more sensors 108, and an air conditioner 112. The HVAC system 100 may include a heater 114 and/or a user interface 126.

The HVAC system 100 includes one or more vents 104. The one or more vents 104 may include a front vent 104*b-c* that is directed at the occupants in the front of the cabin of the vehicle. The one or more vents may include a rear face vent that is directed at the occupants in the rear of the cabin of the vehicle. The one or more vents may include a foot vent 104*a* that is directed at the foot of the occupants in the front of the cabin of the vehicle. Other vents may be directed throughout the front and/or rear of the cabin of the vehicle.

The HVAC system includes a blower 106 that blows or moves air throughout the other components of the HVAC system 100 and out the one or more vents 104. By increasing and/or decreasing the rotation speed of the blower 106, the HVAC system 100 manages and/or controls the amount of air and the airflow rate of the air circulated within the HVAC system 100 and outputted into the cabin of the vehicle.

The HVAC system 100 includes a processor, such as the electronic control unit (ECU) 102, that is programmed to control the rotation speed of the blower 106 and the rotation speed of the motor of the compressor 122. By controlling the rotation speed of the blower 106, the ECU 102 adjusts or manages the airflow rate or amount that is outputted into the cabin of the vehicle. The ECU 102 also adjusts or manages the airflow rate or amount of air that is moved through the air conditioner 112 or the heater 114 to cool or heat the outputted air into the cabin of the vehicle.

The ECU 112 may be coupled to the one or more sensors 108 that detect various environmental parameters. For example, one or more temperature sensors may measure the temperature of the inverter 116 of the air conditioner 112. Another temperature sensor may measure the gas inlet temperature of the air that enters the compressor 122 of the air conditioner 112. In another example, a speed sensor may measure the rotation speed of the blower 106 or the rotation speed of the compressor 122. In another example, a thermometer may measure an ambient temperature within a cabin of the vehicle 200.

The HVAC system 100 includes a memory 110. The ECU 102 may be coupled to the memory 110. The memory 110 may store instructions to execute on the ECU 102 and may include one or more of a random access memory (RAM) or other volatile or non-volatile memory. The memory 110 may be a non-transitory memory or a data storage device, such as a hard disk drive, a solid-state disk drive, a hybrid disk drive, or other appropriate data storage. The memory 110 may further store machine-readable instructions, which may be loaded and executed by the ECU 102 to control the rotation speed of the compressor 122.

The air conditioner 112 includes a condenser 120, a compressor 122 and an evaporator 124. The air conditioner 112 may include an internal heat exchanger 118, such as a coaxial tube internal heat exchanger (SCX). The air conditioner 112 outputs cooled air into the cabin of the vehicle.

The air conditioner 112 includes a compressor 122. The compressor 122 is powered by an engine of the vehicle 200. The compressor 122 may be a gas compressor and/or an electric compressor. The compressor 122 pumps refrigerant vapor under high pressure to the condenser 120. The compressor 122 circulates the refrigerant within the air conditioner 112 under pressure, which concentrates the heat. The compressor 122 changes the refrigerant vapor, which is at a low pressure, into a liquid, which is at a high pressure.

The compressor 122 may have an inverter 116. The inverter 116 controls the rotation speed of the compressor 122. In particular, the inverter 116 controls the rotation speed of the motor of the compressor 122, to regulate the temperature. This increases the efficiency of the compressor 122, reduces noise, extends the life of parts of the compressor 122 and lowers operating costs. Compressor inlet gas is used to decrease the inverter temperature to avoid power loss or damage when the inverter temperature is too high.

The air conditioner 112 may have an internal heat exchanger 118, such as a SCX. An internal heat exchanger 118 may transfer additional heat out of the liquid refrigerant, and thus, helps "sub-cool" the liquid refrigerant below a condensation temperature. The internal heat exchanger 118 transfers heat between the low side pressure flow and the high side pressure flow. This improves the efficiency of the air conditioner 112. The internal heat exchanger 118 cools the liquid refrigerant before the refrigerant is expanded into a vapor by an expansion valve, for example. This additional cooling capacity allows for a smaller compressor or lessens the load on the engine. Moreover, the extracted heat may be used to vaporize droplets of liquid exiting the evaporator 124 before the droplets reach the compressor 122, which would reduce emissions and/or improve fuel economy. Additionally, the use of the internal heat exchanger 118 allows for the use of less refrigerant.

The HVAC system 100 includes a condenser 120. The condenser 120 changes the high-pressure refrigerant vapor to a high-pressure liquid. The vapor is condensed to a liquid because of the high pressure that is driving the refrigerant. This generates heat, which is removed from the condenser 120 by outside air flowing through the condenser 120.

The HVAC system 100 includes an evaporator 124. The evaporator 124 vaporizes and absorbs heat from the air that passes over the evaporator 124. Cold low-pressure refrigerant passes through the evaporator 124 and absorbs the heat from the air that passes over the evaporator 124 so that cold air is circulated inside the vehicle.

The HVAC system 100 may include a user interface 126. The user interface 126 may be a vehicle display or a personal device, e.g., a mobile phone, a tablet, a personal computer, which is connected to the ECU 102 through a network access device (not shown) of the vehicle across a network. The user interface 126 may include any device capable of receiving user input, such as a user interface element, a button, a dial, a microphone, or a touch screen, and any device capable of output, such as a display, a speaker, or a refreshable braille display. The user interface 126 allows a driver or a passenger of the vehicle to communicate with the ECU 102. For example, the driver may be able to provide data to the ECU 102 and/or receive feedback from the ECU 102 via the user interface 126.

The HVAC system 100 may include a heater 114. The heater 114 may have a heater core. The blower 106 may move air across or through the heater core to warm or heat the air, which is outputted through the one or more vents 104 to warm or heat the cabin of the vehicle. Engine coolant may run through the heater core and be used to warm or heat the air.

Figure 3:
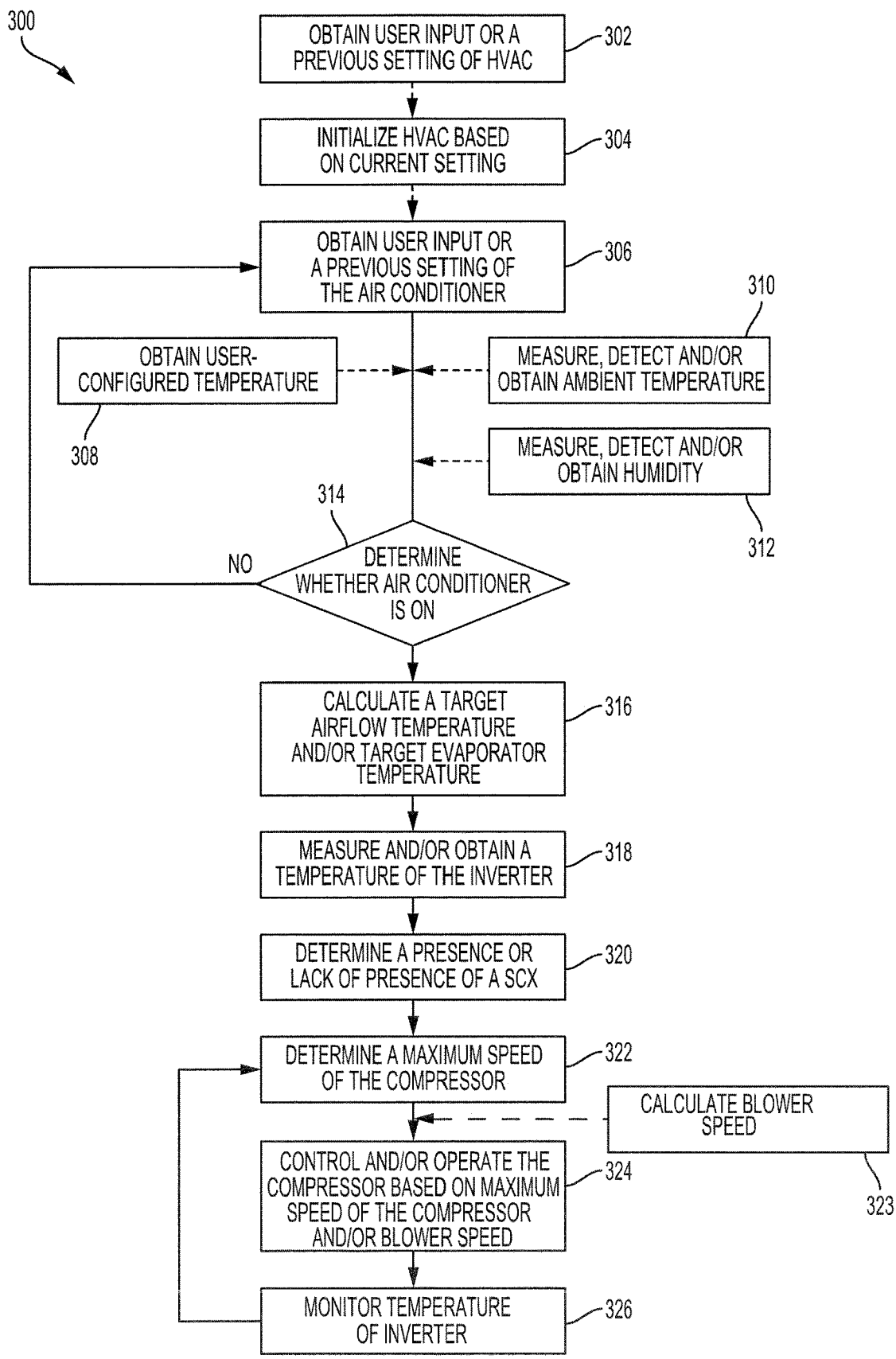
FIG. 3 is a flow diagram of an example process for controlling and/or adjusting the rotation speed of the motor of the compressor of the HVAC system of FIG. 1 according to an aspect of the invention.

FIG. 3 describes the process 300 for controlling and/or adjusting the rotation speed of the compressor 122. One or more computers or one or more data processing apparatuses, for example, the ECU 102 of the HVAC system 100 of FIG. 1, appropriately programmed, may implement the process 300.

The HVAC system 100 may obtain user input or a previous setting for the HVAC system 100 (302). The user input or the previous setting may provide a current setting of the HVAC system 100. The HVAC system 100 may receive the user input from a user interface element, such as a button or an interface element on a display on the user interface 126. The user input may toggle the HVAC system 100 among different settings, e.g., the on or off state. The HVAC system 100 may store the current setting into the memory 110 for retrieval after the vehicle 200 has been turned off and subsequently restarted. The HVAC system 100 may retrieve the previous setting from the memory 110 and use the previous setting as the current setting.

The HVAC system 100 may initialize or turn on based on the current setting (304). For example, the HVAC system 100 may initialize when the user input, such as the depression of a button or a user interface element on the user interface 126, sets the current setting to an on state or when the current setting is set to the on state based on the previous setting. When the HVAC system 100 initializes, the blower 106 of the HVAC system 100 is turned on. The rotation speed of the blower 106 may be based on a blower map that is obtained and/or stored in the memory 110.

When initialized, the HVAC system 100 obtains user input or a previous setting for the air conditioner 112 to determine a current setting of the air conditioner 112 (306). As described above, a user input to determine a setting for a component, such as the air conditioner 112, may be obtained in a variety of manners including through the depression of a button, a user interface element on a user interface 126 or other device. The previous setting may similarly be obtained from the memory 110 or in another manner. The HVAC system 100 uses the user input or the previous setting to set the current setting of the air conditioner 112 into an on, off or automatic state.

When the HVAC system, 100 is initialized, the HVAC system 100 may obtain a user-configured temperature (308). The HVAC system 100 may obtain a user-configured temperature via user input through the user interface 126 or detect an identity of an occupant using one or more sensors 108, such as a camera, and associate the identity to a user profile with the user-configured temperature to obtain the user-configured temperature. The HVAC system 100 may capture the user-configured temperature in degrees Fahrenheit or Celsius. The HVAC system 100 may store the user profile that has the user-configured temperature for the occupant in the memory 110 and retrieve the user profile for the occupant from the memory 110. The HVAC system 100 may retrieve the user profile when the vehicle 200 is activated, such as when an ignition sensor indicates that the ignition has been activated.

The HVAC system 100 may measure, detect and/or obtain an ambient temperature within the vehicle 200 using one or more sensors 108, such as a temperature sensor or a thermometer (310). For example, a temperature sensor within the vehicle may measure the ambient temperature within the vehicle.

In some implementations, the HVAC system 100 may measure, detect and/or obtain a measure of the humidity inside the vehicle 200 (312). The HVAC system 100 may use one or more sensors 108, such as a hygrometer, to measure the humidity.

The HVAC system 100 determines whether the air conditioner is on based on the ambient temperature, the user-configured temperature and/or a current setting of the air conditioner (314). The current setting may be based on the user input and/or the previous setting. The air conditioner 112 is on when the current setting is set to the on state or when the current setting is in the automatic state and the ambient temperature is greater than the user-configured temperature. The air conditioner is off when the current setting is in the off state or when the current setting is in the automatic state and the ambient temperature is less than or equal to the user-configured temperature. The HVAC system 100 regularly and/or periodically monitors the current setting of the HVAC system and/or the ambient and the user-configured temperatures.

When the air conditioner 112 is on, the HVAC system 100 may calculate a target airflow temperature and/or a target evaporator temperature to determine a rotation speed of the blower 106 (316). The HVAC system 100 may use the user-configured temperature to calculate the target airflow temperature and/or the target evaporator temperature. The HVAC system 100 may use the calculated target airflow temperature and/or the calculated evaporator temperature to determine a rotation speed of the blower 106, which maps to a rotation speed of the motor of the compressor 122. The HVAC system 100 may calculate and/or determine the target airflow temperature and the target evaporator temperature based on the other obtained information including the ambient temperature, and/or the ambient humidity.

The HVAC system 100 measures and/or obtains a temperature of the inverter 116 to regulate the rotation speed of the motor of the compressor 122 (318). The HVAC system 100 may use one or more sensors 108, such as an inverter temperature sensor, to measure the temperature of the inverter 116. The inverter 116 regulates the rotation speed of the compressor to maintain a specific temperature, such as the user-configured temperature. Once the specific temperature is reached, the compressor 122 may start to run at a lower rotation speed.

The HVAC system 100 may determine a presence or lack of presence of an internal heat exchanger 118, such as a SCX (320). The memory 110 may store an indicator in the memory 110 that indicates the presence or lack of presence of the SCX. The HVAC system 100 may obtain the indicator from the memory 110 to determine the presence or the lack of presence of the SCX. The indicator may be a factory setting that is set during the manufacturing of the vehicle. Subsequently, the indicator may be switched to or set to indicate the presence or the lack of presence by a technician at a dealership or other maintenance facility using specialized equipment. The presence of the SCX improves cooling efficiency but increases compressor inlet gas temperature, which causes a higher inverter temperature. The SCX improves cooling efficiency by improving the sub-cooling of the refrigerant below a condensation temperature. The SCX, for example, transfers even more heat out of the liquid refrigerant, which improves cooling efficiency. Since the SCX increases compressor inlet gas temperature, the presence of the SCX requires the compressor 122 to operate at slower rotation speeds than without the SCX. The lack of presence of the SCX allows the compressor 122 to operate within a larger range of rotation speeds and at faster rotation speeds than with an SCX but results in reduced cooling efficiency.

Figure 4:
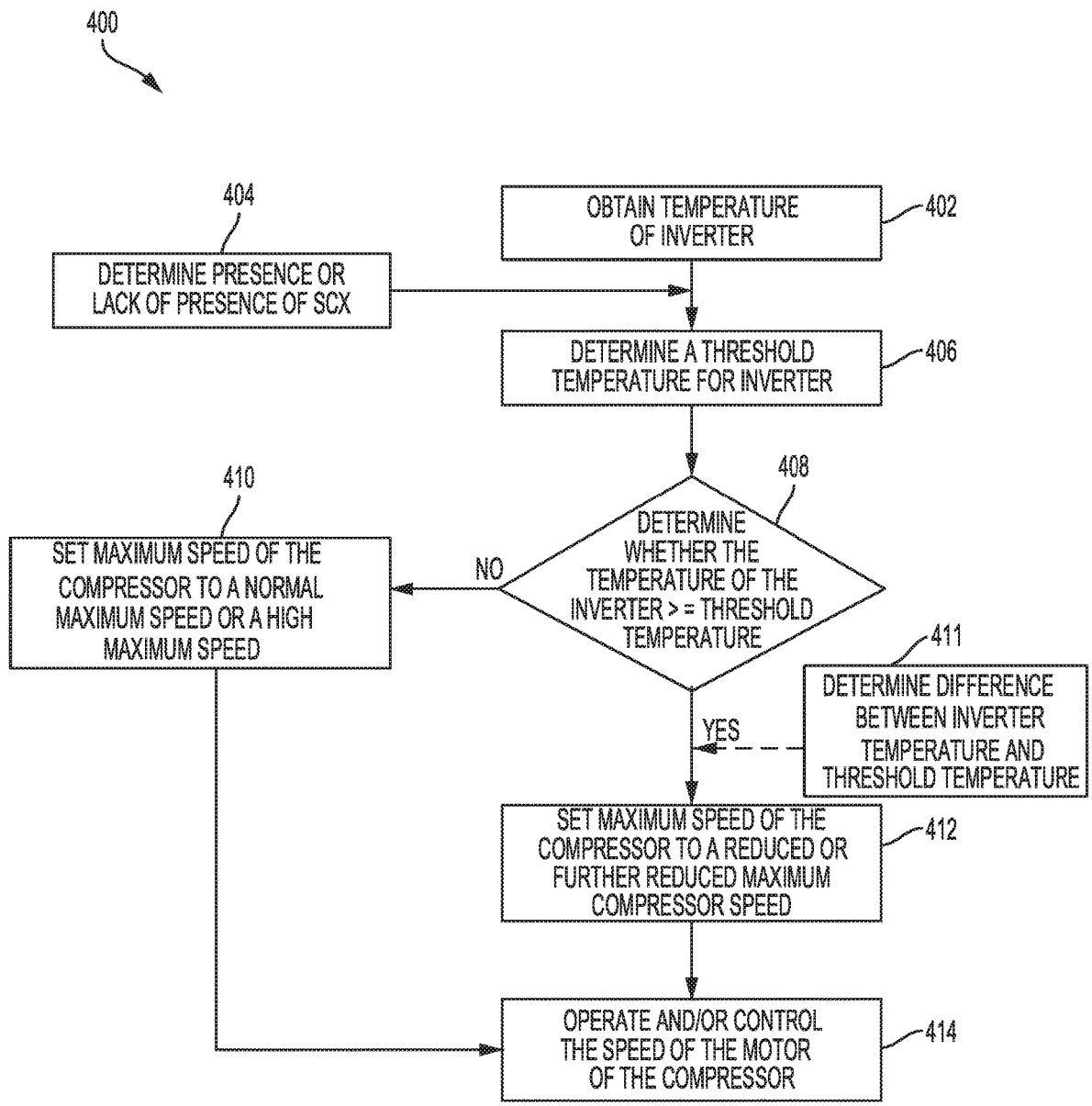
FIG. 4 is a diagram of an example process for determining the maximum rotation speed of the motor of the compressor of the HVAC system of FIG. 1 according to an aspect of the invention.

The HVAC system 100 determines a maximum rotation speed of the compressor 122 based on the temperature of the inverter 116 and/or the presence or the lack of presence of the SCX (322). The presence or the lack of presence of the SCX may be indicated by the obtained indicator. FIG. 4 further describes the calculation or determination of the maximum rotation speed.

The HVAC system 100 calculates or determines a rotation speed for the blower 106 based on the target airflow temperature and/or the target evaporator temperature (323). The HVAC system 100 may calculate a difference between the target airflow temperature and/or the target evaporator temperature and map the difference to a rotation speed of the blower 106 using a blower map that may be stored and obtained from the memory 110.

The HVAC system 100 controls the motor of the compressor to operate the compressor within a range of rotation speeds based on the maximum rotation speed of the compressor 122 (324). The HVAC system 100 may determine or calculate a rotation speed for the motor of the compressor 122 using the rotation speed of the blower 106. For example, the HVAC system 100 may map the rotation speed of the blower 106 to a corresponding rotation speed for the motor of the compressor 122. The HVAC system 100 may limit the rotation speed of the motor of the compressor 122 to a range of rotation speeds based on the type of the compressor and/or the maximum rotation speed of the compressor 122. The HVAC system 100 operates and/or controls the motor so that the rotation speed remains within the range of rotation speeds to allow for a SCX to be adopted to improve cooling efficiency, while preventing damage and/or overheating to other components, such as the inverter 116.

In some implementations, the HVAC system 100 may continually monitor the temperature of the inverter and adjust the compressor rotation speed in real-time, e.g., continuously and/or periodically (326). The HVAC system 100 may adjust the compressor rotation speed in response to the monitored temperature of the inverter 116. For example, the HVAC system 100 may determine that the temperature of the inverter 116 has increased above the temperature threshold, and in response, the HVAC system 100 may decrease the maximum rotation speed of the compressor 122. In another example, the HVAC system 100 may determine that the temperature of the inverter 116 has decreased below the temperature threshold, and in response, the HVAC system 100 may increase the maximum rotation speed of the compressor 122. The compressor 122 operates within a range of speeds that is limited by the maximum rotation speed.

FIG. 4 describes the process 400 for determining the maximum rotation speed of the motor of the compressor 122. One or more computers or one or more data processing apparatuses, for example, the ECU 102 of the HVAC system 100 of FIG. 1, appropriately programmed, may implement the process 400. The HVAC system 100 may determine the maximum rotation speed of the motor of the compressor based on the temperature of the inverter 116 and/or the presence of the SCX.

The HVAC system 100 obtains the temperature of the inverter 116 (402) and determines the presence or the lack of presence of the SCX based on the indicator (404), as discussed above. After the HVAC system 100 obtains the temperature of the inverter 116 and determines the presence or the lack of presence of the SCX, the HVAC system 100 determines a threshold temperature for the inverter (406). The threshold temperature may be a maximum operating temperature of the inverter 116 that is factory set or predetermined, such as 100° C. The maximum operating temperature of the inverter 116 may be a temperature at which power loss is minimized and overheating is prevented to prevent damage to the inverter 116. In some implementations, the threshold temperature may be based on the presence or the lack of presence of the SCX and may be less than the maximum operating temperature of the inverter 116.

For example, the threshold temperature may be 10° C. less than a base temperature, such as the maximum operating temperature, when the HVAC system 100 determines that there is no SCX based on the obtained indicator, for example. In another example, the threshold temperature may be 20° C. less than the base temperature, when the HVAC system 100 determines that there is a SCX based on the obtained indicator, for example.

The HVAC system 100 may determine whether the temperature of the inverter 116 is greater than or equal to the threshold temperature (408). If or when the HVAC system 100 determines that the temperature of the inverter 116 is less the threshold temperature, the HVAC system 100 may set a maximum rotation speed to the normal maximum rotation speed or a high maximum rotation speed (410). The maximum rotation speed may be based on the type of compressor. The high maximum rotation speed may be slower than the normal maximum rotation speed but faster than a reduced maximum rotation speed. The high maximum rotation speed may provide for a safety margin so that the temperature of the inverter 116 does not reach the maximum operating temperature but still allows the compressor 122 to operate at near normal rotation speeds. For example, the normal maximum rotation speed may be approximately 4,000 rpms, the high maximum rotation speed may be approximately 3,750 rpms and a reduced maximum rotation speed may be 3,000 rpms.

The HVAC system 100 may calculate a difference between the temperature of the inverter 116 and the threshold temperature when the temperature of the inverter 116 is greater than or equal to the threshold temperature (411). The HVAC system may use the difference between the temperature of the inverter 116 and threshold temperature to calculate or set the maximum rotation speed.

If or when the HVAC system 100 determines that the temperature of the inverter 116 is greater than or equal to the threshold temperature, the HVAC system 100 may set a maximum rotation speed for the motor of the compressor 122 to a reduced maximum rotation speed or a further reduced maximum rotation speed (412). The reduced maximum rotation speed and the further reduced maximum speed are greater than 0, such that the compressor 122 is not shutoff and remains operating. The maximum rotation speed may be based on the presence or the lack of presence of the SCX and/or the type of compressor 122. If or when there is no SCX, the maximum rotation speed may be set to the reduced maximum rotation speed, which is less than a normal maximum rotation speed. For example, if or when the motor of the compressor 122 normally operates at approximately 4,000 revolutions per minute (rpms), the reduced maximum compressor rotation speed may be 3,000 rpms. If or when there is a SCX, the maximum rotation speed may be further reduced. The further reduced maximum rotation speed is less than the reduced maximum rotation speed. For example, if or when the motor of the compressor 122 normally operates at approximately 4,000 rpms and the reduced maximum rotation speed is approximately 3,000 rpms, the further reduced maximum rotation speed may be approximately 2,000 rpms. Other compressors that may normally operate at approximately 5,000 rpms, 6,000 rpms, 7,000 rpms, or other rotation speeds, as shown in FIG. 5 for example, may have reduced maximum rotation speeds of 4,000 rpms, 5,000 rpms, or 6,000 rpms, respectively and may have a further reduced maximum rotation speed of 3,000 rpms, 4,000 rpms, or 5,000 rpms, respectively. The memory 110 may store a logic table, such as the logic table 500 as shown in FIG. 5 for example. The logic table 500 may map the maximum rotation speeds during normal operation to reduced and further reduced maximum rotation speeds when there is or is not a SCX and when the temperature of the inverter 116 is or is not greater than or equal to the threshold temperature. The ECU 102 obtains and uses the logic table 500 to set the maximum rotation speed based on the indicator, temperature of the inverter and the known type of compressor 122. The type of compressor 122 may be pre-configured.

In some implementations, the HVAC system 100 may set the maximum rotation speed based on the difference between the temperature of the inverter and the threshold temperature. The HVAC system 100 may use the calculated difference in combination with the presence or the lack of presence of the SCX and the type of compressor to set the maximum rotation speed. For example, the reduced and further reduced maximum compressor rotation speeds may be calculated in real-time based on the difference between the temperature of the inverter and the threshold temperature. As the difference increases when the temperature of the inverter 116 exceeds the threshold temperature, the HVAC system 100 may further reduce the maximum rotation speed of the compressor.

The HVAC system 100 operates or controls the rotation speed of the motor of the compressor 122 within a range of rotation speeds that is less than or equal to the set maximum rotation speed (414). The maximum rotation speed may be the normal maximum rotation speed, a high maximum rotation speed, a reduced maximum rotation speed or a further reduced maximum rotation speed based on the temperature of the inverter 116 and/or the indicator of the SCX, as described above. By limiting the rotation speed of the compressor 122 to the maximum compressor rotation speed, the HVAC system 100 limits or suppresses the rotation speed of the compressor 122 and limits the inlet gas temperature. By limiting the inlet gas temperature, the overall temperature of the inverter 116 is limited, which may allow for the adoption or use of the SCX within the vehicle 200 to improve cooling efficiency.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:
1. A heating, ventilation and air conditioning (HVAC) system, comprising:
    a compressor configured to drive refrigerant flow;

an inverter configured to control a speed of the compressor;
a first sensor configured to measure a temperature of the inverter; and
an electronic control unit connected to at least one of the compressor, the inverter or the first sensor, the electronic control unit being configured to:
obtain, from the first sensor, the temperature of the inverter,
determine a range of speeds for the compressor based on the obtained temperature of the inverter and a presence or a lack of presence of a coaxial internal heat exchanger, and
operate the compressor within the determined range of speeds.

2. The HVAC system of claim 1, wherein the electronic control unit is further configured to:
determine whether the temperature of the inverter is greater than or equal to a threshold temperature; and
set a first maximum speed for the range of speeds for the compressor when the temperature of the inverter is greater than or equal to the threshold temperature to prevent damage to the inverter due to overheating.

3. The HVAC system of claim 2, wherein the electronic control unit is further configured to:
set a second maximum speed for the range of speeds for the compressor when the temperature of the inverter is less than the threshold temperature.

4. The HVAC system of claim 3, wherein the first maximum speed is less than the second maximum speed.

5. The HVAC system of claim 1, wherein the electronic control unit is configured to:
obtain a user-configured temperature that indicates an air temperature set by a user;
calculate a target airflow temperature for air that is outputted into a cabin of a vehicle based on the user-configured temperature; and
determine the speed of the compressor that is within the range of speeds and is based on the target airflow temperature, wherein the electronic control unit operates the compressor at the determined speed.

6. The HVAC system of claim 5, further comprising:
a second sensor configured to detect or measure at least one of an amount of humidity in a surrounding environment or an ambient temperature of the surrounding environment;
wherein the electronic control unit is configured to:
calculate the target airflow temperature further based on the at least one of the amount of humidity in the surrounding environment or the ambient temperature of the surrounding environment.

7. The HVAC system of claim 1, wherein the range of speeds has a first maximum speed when the temperature of the inverter is greater than or equal to a threshold temperature and a second maximum speed when the temperature of the inverter is less than the threshold temperature.

8. A heating, ventilation and air conditioning (HVAC) system, comprising:
a compressor configured to drive refrigerant flow;
an inverter configured to control a rotation speed of the compressor;
a first sensor configured to measure a temperature of the inverter; and
a processor connected to at least one of the compressor, the inverter or the first sensor, the processor being configured to:
determine a range of rotation speeds for the compressor based on the temperature of the inverter and a presence or lack of presence of a coaxial internal heat exchanger, and
operate the compressor within the range of rotation speeds.

9. The HVAC system of claim 8, wherein the processor is further configured to:
determine whether the temperature of the inverter is greater than or equal to a threshold temperature; and
set a first maximum rotation speed for the range of rotation speeds for the compressor when the temperature of the inverter is greater than or equal to the threshold temperature to prevent damage to the inverter due to overheating.

10. The HVAC system of claim 9, wherein the processor is further configured to:
set a second maximum rotation speed for the range of rotation speeds of the compressor when the temperature of the inverter is less than the threshold temperature, wherein the first maximum rotation speed is less than the second maximum rotation speed.

11. The HVAC system of claim 8, wherein the processor is configured to:
obtain a user-configured temperature that indicates an air temperature set by a user;
calculate a target airflow temperature for air that is outputted into a cabin of a vehicle based on the user-configured temperature; and
determine the rotation speed of the compressor that is within the range of rotation speeds based on the target airflow temperature, wherein the processor is configured to operate the compressor at the determined rotation speed.

12. The HVAC system of claim 11, further comprising:
a second sensor configured to detect or measure at least one of an amount of humidity in a surrounding environment or an ambient temperature of the surrounding environment;
wherein the processor is configured to:
calculate the target airflow temperature further based on the at least one of the amount of humidity in the surrounding environment or the ambient temperature of the surrounding environment.

13. The HVAC system of claim 8, wherein the processor is further configured to:
adjust the rotation speed of the compressor in real-time based on the temperature of the inverter.

14. A heating, ventilation and air conditioning (HVAC) system, comprising:
a compressor configured to drive refrigerant flow;
an inverter configured to control a speed of the compressor;
a first sensor configured to measure a temperature of the inverter; and
an electronic control unit connected to at least one of the compressor, the inverter or the first sensor, the electronic control unit being configured to:
obtain, from the first sensor, the temperature of the inverter,
determine a range of speeds for the compressor based on the temperature of the inverter and a presence or a lack of presence of a coaxial internal heat exchanger,
operate the compressor within the determined range of speeds, and adjust the speed of the compressor in real-time based on the temperature of the inverter.

15. The HVAC system of claim 14, wherein the electronic control unit is configured to:
set a first maximum speed for the range of speeds for the compressor when the temperature of the inverter is greater than or equal to a threshold temperature to prevent damage to the inverter due to overheating.

16. The HVAC system of claim 15, wherein the electronic control unit is configured to:
set a second maximum speed for the range of speeds of the compressor when the temperature of the inverter is less than the threshold temperature, wherein the first maximum speed is less than the second maximum speed.

17. The HVAC system of claim 14, wherein the electronic control unit is configured to:
obtain a user-configured temperature that indicates an air temperature set by a user;
calculate a target airflow temperature for air that is outputted into a cabin of a vehicle based on the user-configured temperature; and
determine the speed of the compressor that is within the range of speeds based on the target airflow temperature, wherein the electronic control unit is configured to operate the compressor at the determined speed.

18. The HVAC system of claim 17, further comprising:
a second sensor configured to detect or measure at least one of an amount of humidity in a surrounding environment or an ambient temperature of the surrounding environment;
wherein the electronic control unit is configured to:
calculate the target airflow temperature further based on the at least one of the amount of humidity in the surrounding environment or the ambient temperature of the surrounding environment.

\* \* \* \* \*